Patented May 2, 1944

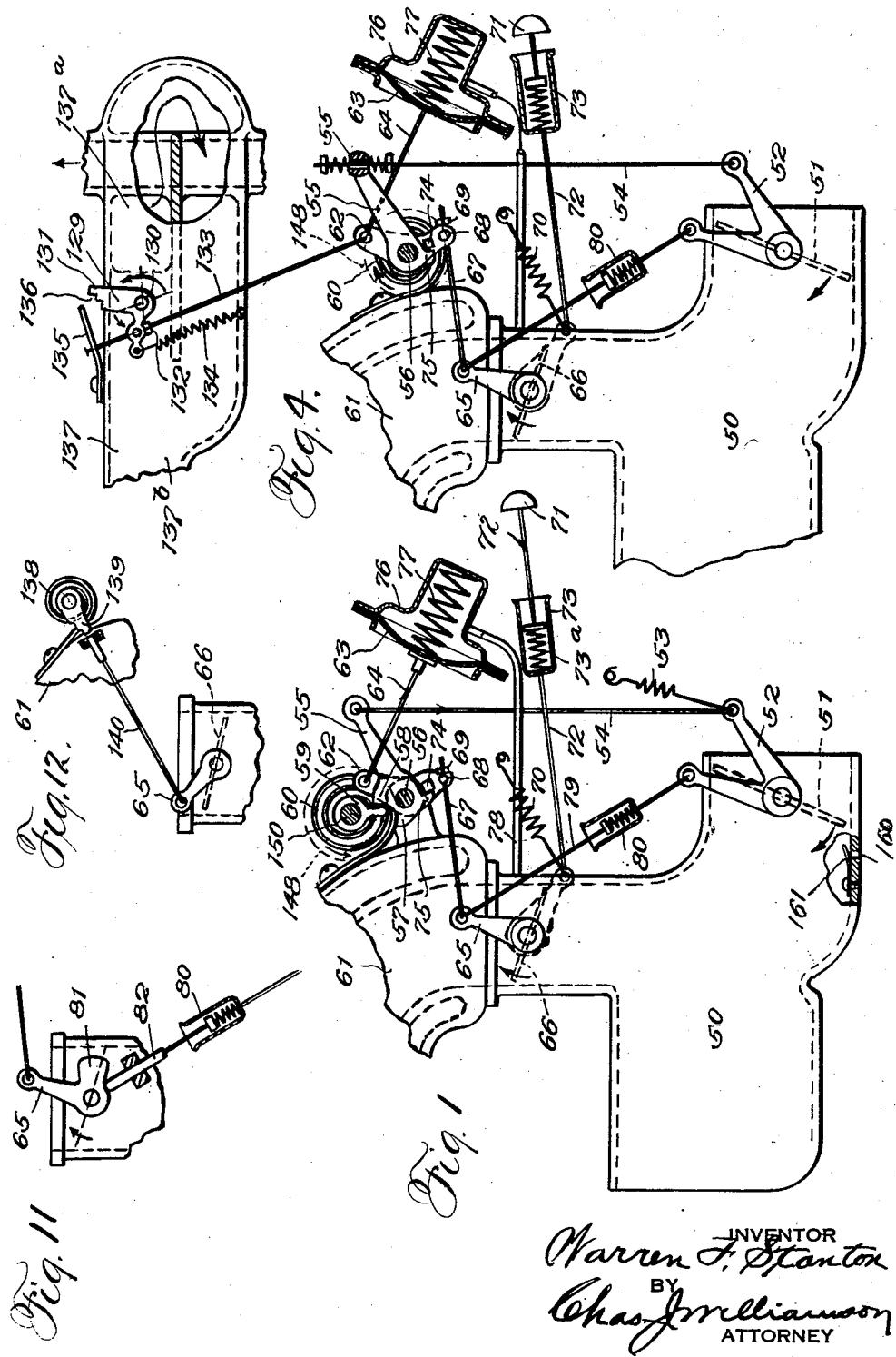

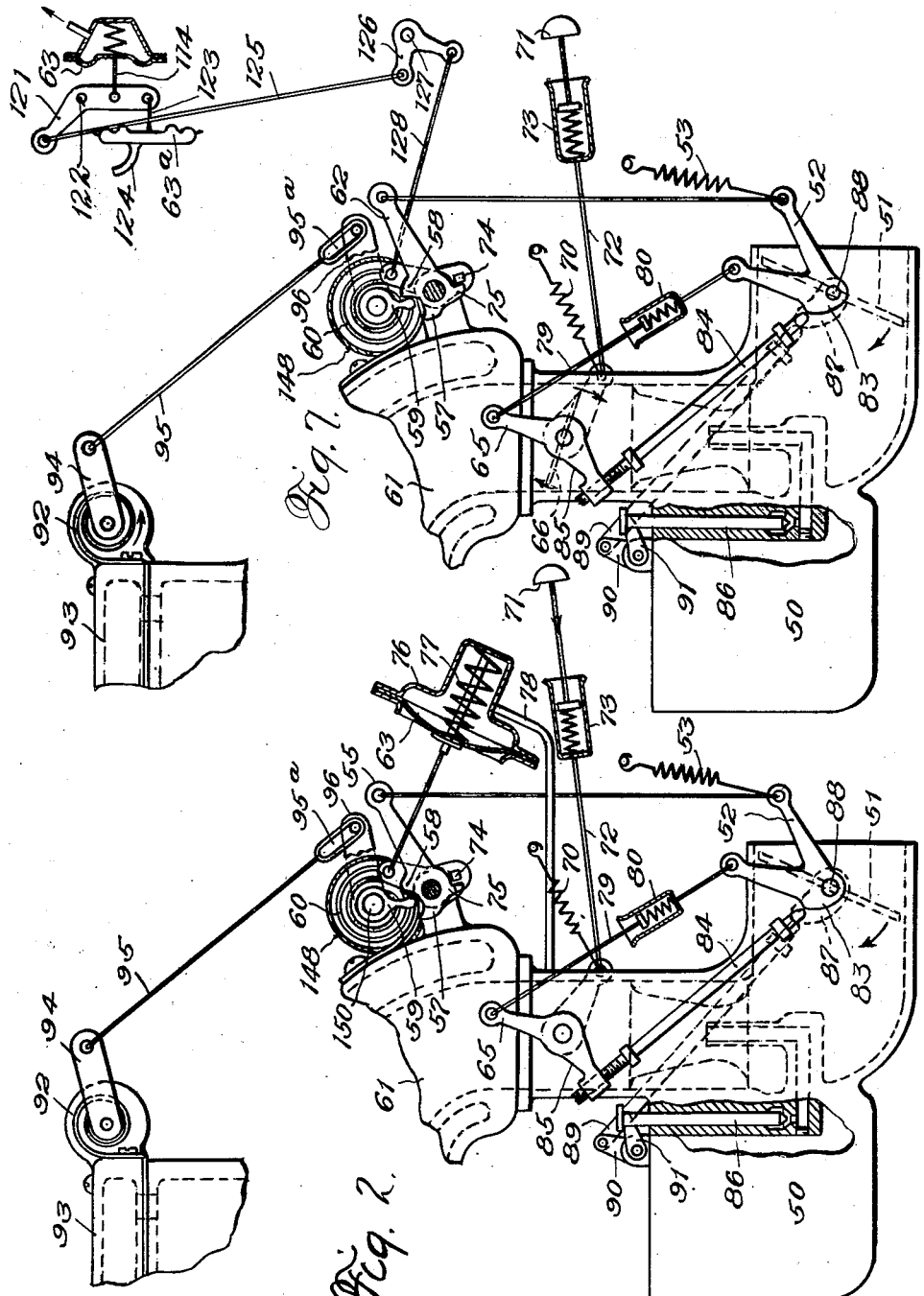

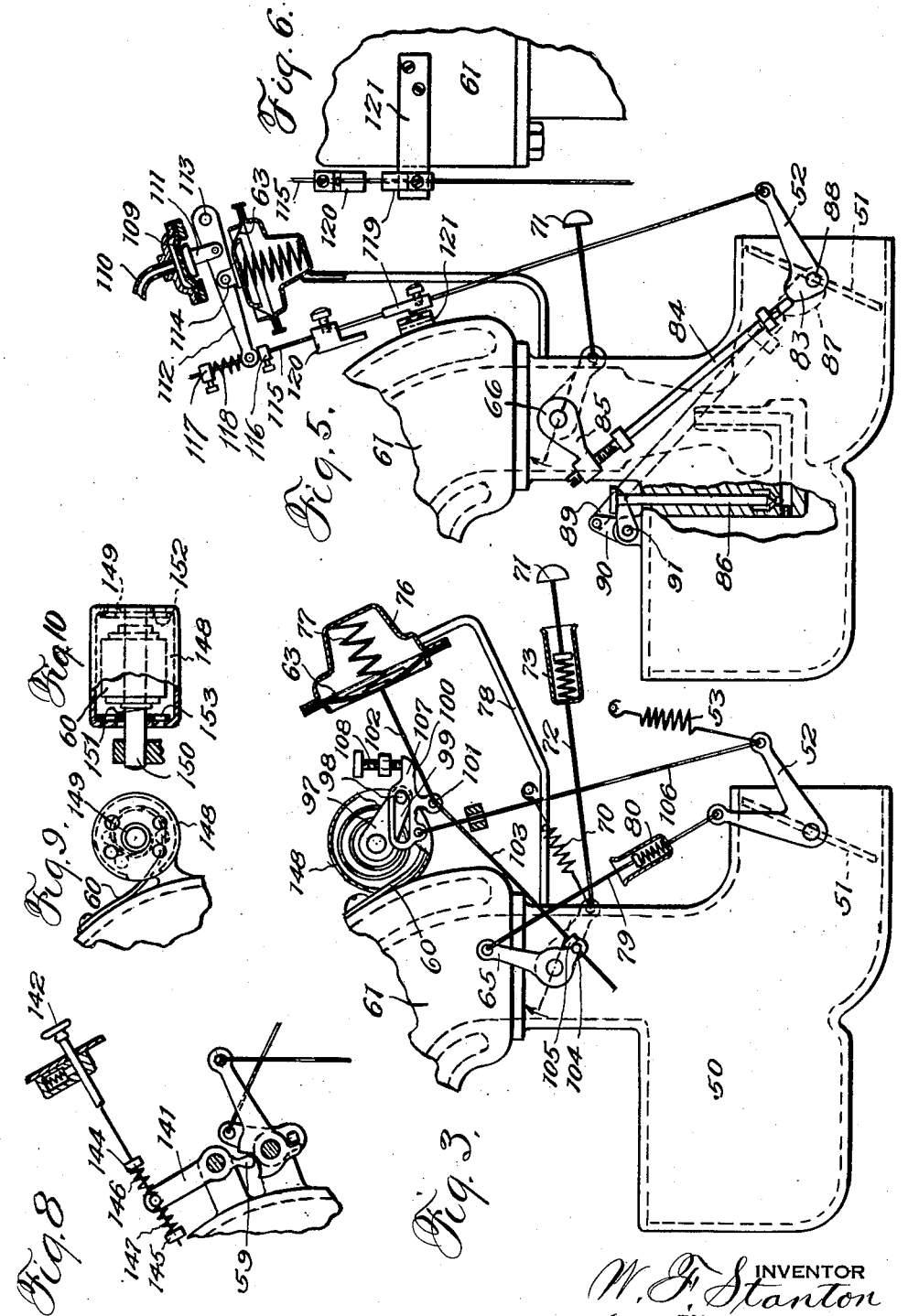

2,348,033

UNITED STATES PATENT OFFICE 2,348,033

FUEL MIXTURE CONTROL

Warren F. Stanton, Pawtucket, R. I., assignor, by mesne assignments, to American Car and Foundry Investment Corporation, New York, N. Y., a corporation of Delaware Application March 19, 1932, Serial No. 600,038

34 Claims. (Cl. 123—119)

Taking the case of an explosion or internal combustion engine to exemplify my invention, the nature of the fuel mixture—gasoline and air, that is, the proportion of gas and air, should vary under the varying operating conditions of the engine—a rich mixture being required under certain conditions and a lean or leaner under other operating conditions. The mixture, of course, should be just that which is most suitable to the engine conditions at the time, for the most efficient and otherwise satisfactory use of fuel. There are, broadly three operating conditions to which the mixture should be adapted, as to richness or leanness. They are (1) starting of a dead engine; (2) idling; and (3) running. And a factor to be reckoned with in each of these conditions is the engine temperature.

The important object of my invention is to assure that fuel mixture which is best fitted for the requirements of each operating condition and varying the mixture from time to time in correspondence with the varied requirements, and another object is to accomplish this by means that causes the mixture variation automatically by causing movement of the actuating parts from the mixture using instrumentality itself, that is to say the engine itself, if it is an internal combustion engine that is dealt with.

I will describe or explain my invention in relation to an internal combustion engine having a conventional carburetor.

The nature of the fuel mixture with a conventional carburetor is controlled by a choke valve, or means for cutting off the air supply to the carburetor. Cutting off air supply results in enriching the mixture and increasing air leans the mixture. And the amount of throttle opening affects the mixture by varying the turbulence of the flowing mixture and thereby affecting the admixture of the air and gasoline components.

I find it impossible to obtain satisfactory control by temperature alone, since with a cool start the thermostat has little or no action for a considerable period of time, and since the degree of wetness of the inlet manifold at a given instant, with its effect on the running of the engine at that time, determines the amount of fuel required, and temperature does not follow this wetness condition. As the firing conditions of the engine depend upon this degree of wetness, and as the firing conditions affect the engine cylinder pressure, exhaust manifold pressure, and inlet manifold pressure so that those pressures vary instantaneously with the condition of the mixture, I use these various pressures, either singly or in combination, as a primary means of controlling the mixture through choke and throttle valve, and use the mixture temperature or/and the water jacket temperature as a modifying or limiting means, as by use of a thermostat or temperature responsive device.

Another important feature of my invention is the production of positive unchoke by throttle action. Flooring the accelerator pedal to open the throttle fully, completely unchokes the engine, as does closing the throttle, so that the car drives the engine with its accompanying very high vacuum.

Another important feature of my invention is the use of a thermostat that is yielding for the first portion of its range of action and unyielding for the latter portion. This permits pressure and throttle control of the choke through most of the thermostat temperature range and finally a lockout of the choke by the thermostat at high temperature.

I also provide for the thermostat to continue its expansion freely when hot, thus preventing such damage to it as would happen if its expanding movement should be positively stopped.

With my invention for mixture control, the primary consideration is the firing conditions of the engine itself supplemented or modified by engine heat conditions, and by manual operation of the throttle.

*Starting.*—The mixture going through the intake manifold, when the engine is cranked is infinitely lean. In order that the engine may start firing, a rich mixture should be instantly supplied and the throttle should be partially opened to produce sufficient fuel supply to the starting up engine. To assure a rich mixture, the carburetor must be choked, that is its air supply must be cut off, or diminished. The degree of choking, or diminution of air supply will depend on the engine temperature. A cold engine requires a rich mixture and a warm or hot engine a leaner mixture, taking account of the vaporizing effect on gasoline of its contact with the heated surfaces of the engine. Features of my invention are means for closing the choke valve during starting and regulating the degree of closure according to engine conditions, and to hold the throttle partially open to assure sufficient fuel supply.

*Idling cold.*—Immediately the engine starts firing it should be supplied with a leaner mixture than that used in starting, as the mixture required for starting is too rich. Since the engine is cold, or has no high enough temperature that tioned and hereinafter to be described, but my invention is to be understood as consisting in whatever is described by or is included within the terms or scope or legal meaning of the appended claims.

Because it makes for clarity of illustration, the annexed drawings will be found diagrammatic in many respects. In such drawings:

Fig. 1 is a side elevation with parts in section of an embodiment of my invention shown applied to a gas engine carburetor, the automatic control being by use of the intake manifold vacuum and temperature;

Fig. 2 is a similar view of another embodiment of my invention, the automatic control means utilizing the water jacket temperature;

Fig. 3 is a similar view of another embodiment of my invention;

Fig. 4 is a view similar to Fig. 1 with the addition of means to control passage of heated exhaust gases through the heater manifold;

Fig. 5 is a view similar to the figures illustrating an embodiment of my invention in which the automatic control is by the intake manifold pressure and temperature and cylinder pressure;

Fig. 6 is a side view of a portion of what is shown in Fig. 5;

Fig. 7 is a similar view illustrating an embodiment of my invention for control by intake manifold pressure and temperature, and exhaust manifold pressure;

Fig. 8 is a detail view partly in section and partly in elevation illustrating an embodiment of my invention in which control is effected by use of intake manifold pressure and by hand;

Figs. 9 and 10 are, respectivly, detail views of a thermostat damper or ventilator;

Fig. 11 is a detail view showing an embodiment of my invention in which the connection between the choke and throttle includes a cam;

Fig. 12 is a detail view showing a temperature-operated throttle latch.

Corresponding parts in the various figures are designated by the same reference numerals.

I will now describe the embodiments of my invention by reference to the drawings, referring when necessary to particular figures.

Carburetor 50, has an air inlet with a choke valve 51, operated by lever 52, movement in the direction of the arrow opening the choke. This valve is normally held closed by spring 53, and is connected by rod 54, with lever 55, pivoted freely on pin 56. Lever 55, has two jaws 57 and 58, with which coacts an arm 59, attached to and rotated by thermostat 60. Thermostat 60, is screwed to intake manifold 61, the position being selected for the best representative condition of mixture temperature. Heating of the thermostat causes it to rotate pin 150, attached thereto and to rotate arm 59, in the direction indicated by the arrow. Also pivoted freely on pin 56, is lever 62, to one arm of which is connected diaphragm 63, by rod 64. Another arm is connected to throttle lever 65, of throttle valve 66, by rod 67, which slides through pin 68, held in arm 62, and has fastened to it a collar 69, so that rod 67 is free to slide through pin 68, in one direction, but not the other. When arm 62 rotates counterclockwise, it operates lever 65, to open the throttle valve, but when it rotates clockwise, it does not operate throttle valve 66.

Throttle 66, is normally held closed by spring 70, and is manually opened by pedal 71, operating rod 72, through the slip joint 73. Arm 62 has on it a stop lug 74, with which a finger 75, on lever 55 may coact. Diaphragm 63, is held in a housing 76 and is normally held in the position shown by spring 77. The interior of housing 76, is connected with the intake manifold by tube 78, so that diaphragm 63 is subject to the pressure in the intake manifold.

Throttle lever 65, is also connected with choke lever 52, by rod 79, and slip joint 80 (Fig. 1) or it may be operatively connected with lever 52, by cam 81, on lever 65, rod 82 and slip joint 80, as illustrated in Fig. 11. A different connection between lever 52, and lever 65, may be provided through cam 83, on lever 52, rod 84, and arm 85 (Fig. 5). The purpose of these connections is hereinafter explained.

Additional enrichment of the mixture may be caused when choke valve 51, is closed, as shown in Figs. 2, 5 and 7, by an auxiliary by-pass valve 86, operated by a cam 87, attached to stud 88, on which valve 51, is pivoted. The cam 87, acts on one end of rod 89, movement of which rocks levers 90 and 91, to lift valve 86.

I may also provide (see Fig. 2) a second thermostat 92, attached to and heat responsive to temperature of the water jacket 93, which by crank 94, rod 95, and lever 96 acts in conjunction with thermostat 60, upon lever 55, and choke and throttle valves.

It may be necessary to provide means for preventing too great enrichment of the mixture when starting. This (see Fig. 1) I accomplish by providing an auxiliary air inlet port 160, normally closed by spring flap valve 161, but which may be opened by the suction in the intake manifold upon the instant of starting, and thus slightly lean the mixture.

In Fig. 3 are different operative connections between thermostat 60, and choke and throttle levers. Thermostat 60, has a pin 98, in a slot 99, on lever 100. This lever is connected by arm 101, and rod 102, with diaphragm 63, and with lever 65 by rod 103, which is slidable through pin 104, on lever 65, and is provided with a stop collar 105, so that movement in one direction of rod 103, operates lever 65, but movement in the other direction does not operate this lever. Lever 100 is also connected with choke lever 52, by rod 106 and has an arm 107, with which an adjustable stop screw 108 abuts that forms a fulcrum or pivot for lever 100.

As illustrated in Fig. 5, I may control the action of choke and throttle by inlet manifold pressure by diaphragm 63 and by engine pressure (preferably by a timed sample of said pressure) by diaphragm 109, which by pipe 110, is operatively connected directly with the cylinder, and by plunger 111, is connected with lever 112, pivoted at 113, and to which diaphragm 63, is also connected by plunger 114. Arm 112 by means of rod 115, and collar 116, positively actuates choke lever 52, and through cam 83 and rod 84, actuates throttle valve 66, and by means of collar 117, and spring 118, yieldably operates lever 52, in the other direction. On rod 115 are stop collars 119 and 120, which coact with thermostat 121 bolted to intake manifold 61.

Referring to Fig. 7, it will be seen, I provide means for operating arm 62, by the combination of intake manifold pressure, through diaphragm 63, and exhaust manifold pressure through diaphragm 63a, these diaphragms being, respectively, connected to lever 121, pivoted at 122, by plungers 114 and 123, respectively, and diaphragm 63a being connected with the exhaust manifold by tube 124. Lever 121 is connected to arm 62 by rod 125, lever 126, pivoted at 127 and rod 128.

Referring to Fig. 4, provision is made to control flow of exhaust gases around the intake manifold by a butterfly valve 129, fastened to stud 130, which valve is operated by lever 131. This valve 129, is normally held closed by stop collar 132 on rod 133, connected with arm 62, and is opened by spring 134, when arm 62 moves in a clockwise direction. It may be prevented from being opened by thermostat 135, coacting with a series of notches 136, on lever 131, thermostat, 135 being in position to prevent opening when the heater manifold 137 is cold and being in a clear position, as shown, when manifold 137 is hot. By changing the relation of valve 129 and arm 131, and reversing the action of thermostat 135, I maintain an open manifold heater diaphragm position with an open throttle and vice versa. Similar results may be obtained by eliminating thermostat 135, and connecting rod 133, with lever 55, or arm 131 may be connected to both arm 62 and arm 55.

As shown in Fig. 12, a stop may be actuated to prevent opening of throttle 66, when the engine is cold by a thermostat 138, bolted to intake manifold 61. Pivoted arm 139 and rod 140, controlled in their movement by thermostat 138, prevent opening of throttle 66, while the engine is cold, but allows opening of throttle 66, when the engine is warm.

In Fig. 8, I provide for hand control in place of automatic thermostat control, by attaching to lever 59, lever arm 141. The position of arm 59, is yieldably controlled by dash button 142, at the end of rod 143, stop collars 144 and 145, on said rod and springs 146 and 147.

In Figs. 9 and 10, I show, in detail, a ventilator or damper for thermostat 60. The latter is enclosed in a housing 148, the ends of which are perforated with holes, 149. Attached to pivot rod 150, to which thermostat 60, is fastened, and which is rotated by the latter, are shutters 151, and 152, also provided with holes 153, so that as the thermostat heats up and rotates rod 150, holes 153, are brought into juxtaposition with holes 149, in housing 148. Ventilation and heat transfer are thus afforded. When the thermostat 60, is cold, holes 153 and 149 are out of juxtaposition, thus closing housing 148, to the outside air and allowing the minimum of heat transfer.

Describing the operation of the devices shown, and first considering control by the inlet manifold pressure and a single thermostat operated by the mixture temperature, as illustrated in Fig. 1, with the engine stopped and cold, thermostat 60, is completely contracted, and arm 59, is in the position shown, pressure in the intake manifold is atmospheric and spring 77, by rod 64, holds arm 62, in the position shown, so that stop 74 allows spring 53 to move lever 55, to the position illustrated, and thus by rod 54, and lever 52, to close choke valve 51. In this position arm 62 also partially opens throttle 66, beyond the normal idling position by collar 69, rod 67, and lever 65, against the tension of spring 70, which constantly tends to close the throttle, but which is less powerful than spring 77. Thus the engine is completely choked and the throttle partially opened, providing the proper condition for starting.

If the engine while stopped is warm or hot, thermostat 60, will have expanded, thus moving arm 59, in counterclockwise direction, and by jaw 58, preventing lever 55, from assuming full choke position, the vacuum and throttle control of choke being thereby modified by the temperature of the engine while stopped, or not running.

The operator now cranks the engine. Immediately the engine starts firing a vacuum is created in the intake manifold and this vacuum acting on diaphragm 63, moves arm 62, by rod 64, in clockwise direction against pressure of spring 77. This change in the position of stop 74, by finger 75, rotates lever 55, in clockwise direction and thus opens choke 51, against pressure of spring 53. Movement of arm 62, also allows spring 70 to close throttle 66, to near normal idling position. With the engine cold and arm 59 in the position shown, the extent of choke at idling speed depends wholly on the vacuum. As the engine heats up, and arm 59 thereby rotates counterclockwise, the position of arm 55, and therefore the degree of choke, may be limited by either finger 75, abutting against stop 74, or by jaw 58, abutting against arm 59. Thus the degree of choke is controlled by either vacuum, or temperature, or both. When the engine is fully heated, arm 59, abutting against jaw 58, hold choke 51, completely open. The face of jaw 58 is of such a shape that when lever 55 has moved clockwise to the full unchoke position, it forms an arc concentric with the center of arm 59, so that further movement of the thermostat as it heats up is allowed, while arm 59 still holds lever 55 positively in a full unchoke position. Thus all the ideal idling conditions are attained.

Assume the engine to be idling cold and the operator desires to run the engine. He controls speed in the usual manner by opening throttle 66, by pedal 71, spring 73a being stronger than spring 70, and rod 67, sliding through pin 68, permitting free opening of the throttle with regard to arm 62. Opening the throttle tends to unchoke valve 51, by rod 79, and spring 80, but as spring 80, is weaker than spring 70, full effect is not attained until spring 80, is fully compressed, further movement of the throttle then tending to unchoke. This tendency to unchoke, however, is resisted by jaw 57, abutting against arm 59, when the engine is cold, or cool. Thus full unchoke is prevented under these conditions, according to the degree of temperature of the engine, and also full throttle opening is prevented under like conditions. When the engine is hot, however, arm 59, has moved so that jaw 57, cannot abut against it, and full unchoke and full throttle opening are permitted.

Should the mixture become too lean, the engine will backfire through the carburetor and increase the pressure against diaphragm 63. This pressure, acting in conjunction with spring 77, will move arm 62, counterclockwise, changing the position of stop 74, and permitting full choke by spring 53. If the mixture becomes too rich and the engine starts to "buck" the operator may unchoke by opening throttle 66, fully, in which case spring 80, will be fully compressed and rod 79, will open choke valve 51, or he may unchoke by closing the throttle completely. This will immediately increase the intake manifold vacuum and by action on diaphragm 63, will rotate arm 62, clockwise, and stop 74 abutting finger 75, will move lever 55, clockwise and thus open choke valve 51.

Stalling is prevented under any conditions. Assume the engine to be idling. Immediately that it starts to slow down to near the stopping speed, pressure in the intake manifold decreases. This allows spring 77, to overcome diaphragm 63, and move arm 62, counterclockwise and thus, by pin 68 and collar 69, on rod 67, to positively move lever 65 to open throttle 66. Movement of arm 62 counterclockwise also moves stop 74 away from finger 75, and if the engine is cold, or cool, so that arm 59 does not limit movement of lever 55, the engine is also partially choked. Thus stalling is prevented by throttle opening alone when the engine is hot, and by throttle opening and partial choking when engine is cold or cool.

When the car is driving the engine at a greater speed than that provided by the throttle opening, increased vacuum is caused in the intake manifold. This acting on diaphragm 63, moves arm 62 clockwise and by stop 74, abutting against finger 75, positively rotates arm 55, to open the choke and lean the mixture.

As hereinbefore mentioned, the ideal method of temperature control is by both mixture temperature and water temperature. To do this, I provide (see Fig. 2) thermostat 92, mounted on the water jacket 93, and thus responsive to the water temperature. This thermostat has an arm 94, by rod 95, connected with lever 96, attached to thermostat 60. As the action of thermostat 92, is slower, both in heating up and cooling, than that of thermostat 60, rod 95, is provided with slot 95a, which allows free movement of thermostat 60, at the start of heating up and of cooling, but which provides the desirable retarding effect of thermostat 92, as the engine either warms or cools.

Describing the action of the manifold by-pass shown in Fig. 4, I connect the thermostat 60, directly with the arm 55, so that expansion of the thermostat tends to open the choke and contraction of the thermostat closes it. Diaphragm 63 is connected with arm 62, which rotates freely on the hub of the thermostat 60, and has a stop 74, so that action of the vacuum on diaphragm 63, tends to unchoke the carburetor. The exhaust gases from the engine enter heater manifold 137 through port 137a and exhaust through port 137b, and when valve 129, is closed, by-pass as shown by the arrow around the intake manifold, and when valve 129 is open, go directly out of port 137b. Valve 129, which is fastened to stud 130, tends to open by spring 134, attached to an arm on lever 131, but is held from opening by collar 132, on rod 133, when the engine is stopped, when spring 77, holds arm 62, in the position shown. When held shut in this position, with the manifold heater cold, it is held locked by thermostat 135, abutting against notches 136, in arm 131. By providing a series of such notches, the degree to which it is held locked shut may be controlled by the heat of the manifold. When the engine starts, vacuum acting on diaphragm 63, rotates arm 62, to pull collar 132 away from lever 131, thus allowing the temperature of the manifold 137, to control the opening of valve 129. Thermostat spring 135, allows spring 134, to completely open the valve when the manifold is hot. Thus the degree of heating by exhaust gases is controlled by the exhaust manifold temperature and the intake manifold pressure.

Controlling by combination of engine pressure, intake manifold pressure and intake manifold temperature, is illustrated in Fig. 5, where diaphragm 63, is operated by intake manifold pressure, diaphragm 109, by engine pressure, and thermostat 121 (temperature) controls the degree to which these diaphragms may control the choke. Stop 120 on rod 115 abuts against thermostat 121, when the latter is cold and prevents full opening of the choke in this condition. Stop 119, abuts against thermostat 121, when the latter is hot and prevents closure of the choke under this condition. The degree to which the temperature by thermostate 121, controls the position of the choke valve may be varied by providing stops 120 and 119, with a series of notches, coinciding with various positions of thermostate 121 as it heats up.

Control by combination of intake manifold pressure, exhaust manifold pressure and intake manifold temperature is illustrated in Fig. 7, where diaphragm 63 is operated by intake manifold pressure, diaphragm 63a by exhaust manifold pressure, and the combination of effects of these pressures is transmitted to lever 62, through lever 121, rod 125, lever 126 and rod 128, the action of thermostat 60 being the same as hereintofore described with relation to Fig. 1.

Combination of hand control and intake manifold pressure is illustrated in Fig. 8. Upon starting with a cold engine, the operator pulls dash button 142, thus yieldably moving lever 141, and positioning arm 59, to the same position as it would be moved by a cold thermostat as described in connection with Fig. 1.

Upon starting with a cold engine, the operator pulls dash button 142, thus yieldably moving lever 141, and positioning arm 59, to the same position as it would be moved by a cold thermostat as described in connection with Fig. 1. The actions of arm 59 and of diaphragm, throttle valve, choke valve, etc., are the same as described in connection with Fig. 1, the only difference being that the position of arm 59 is varied by the operator instead of by the intake manifold heat through the action of thermostat 60. By providing dash button 142 with a manual pullout, and a time delay operated pushin, the action of thermostatic control may be approximated.

It will be apparent that by my invention the combined effect of the intake manifold pressure and mixture temperature controlling the action of the choke valve, throttle valve, and heater manifold valve, I not only provide for a proper mixture for all operating conditions, but eliminate a number of auxiliary features now necessary (such as mechanism for acceleration duration fuel charge), in present carburetors, manual choke, thermostatically operated manifold heater valve, auxiliary starting devices, etc.

What I claim is:

1. A mixture control for internal combustion engines having a carburetor with a choke valve, a throttle valve and an automatic mechanism for moving such valves actuated by engine-produced pressure.

2. A mixture control for internal combustion engines having a carburetor with a choke valve, a throttle valve and an automatic mechanism for moving such valves actuated by intake manifold pressure.

3. A mixture control for internal combustion engines having a carburetor with a choke valve, a throttle valve and automatic means for moving such valves actuated by exhaust manifold pressure.

4. A mixture control for internal combustion engines having a carburetor with a choke valve, a throttle valve and automatic means for moving such valves actuated by mixture temperature, and additional means comprising a pressure-responsive element connected with the engine side of the throttle valve.

5. A mixture control for internal combustion engines having a carburetor with a choke valve, a throttle valve and automatic means for moving such valves actuated by intake manifold pressure, exhaust manifold pressure and mixture temperature.

6. A mixture control for internal combustion engines having a carburetor with a choke valve, a throttle valve and automatic means for moving such valves actuated by intake manifold pressure, exhaust manifold pressure, mixture temperature and water jacket temperature.

7. A mixture control for internal combustion engines comprising a carburetor, a throttle valve, a choke valve, the carburetor having a nozzle that discharges into the same between said valves, and means operatively interconnecting throttle and choke valves acting during the opening movement of the throttle valve to effect at least a partial opening of the choke valve, comprising a pressure-operated motor device in pressure communication with the engine beyond the throttle valve.

8. A mixture control for internal combustion engines comprising a carburetor, a throttle valve, a choke valve, the carburetor having a nozzle that discharges into the same between said valves, means operatively interconnecting throttle and choke valves acting during the opening movement of the throttle valve to effect at least a partial opening of the choke valve, comprising a pressure-operated motor device in pressure communication with the engine beyond the throttle valve, and a yieldable operative connection between the two valves.

9. In a carburetor, a throttle valve, a choke valve, a nozzle discharging into said carburetor between said valves, manual means for operating said throttle valve, means connected with throttle and choke valves whereby said choke valve will be at least partially open when said throttle is moved to full open position, and heat responsive means for regulating movement of the throttle valve.

10. A carburetor comprising a choke valve, resilient thermostatic means urging said valve closed, manifold vacuum responsive means resiliently connected with said valve for urging said valve open upon normal manifold vacuum, a throttle valve, and means actuated by said throttle valve for positively opening the choke valve upon opening the throttle valve wide.

11. An exhaust jacketed inlet manifold, a carburetor connected thereto and a thermostat mounted on said manifold, a throttle valve in said carburetor, a movable idle stop therefor, an air entrance, a choke valve therein, a vacuum motor operated by the inlet manifold suction mounted adjacent to said carburetor and connected so as to work in conjunction with said thermostat, a connection from the operative part of said motor to said choke and to said throttle stop so that the choke valve is opened and the throttle stop is moved to the closed position after the engine fires whenever the temperature of the thermostat is sufficiently high, a one way connection between the throttle valve and the choke valve whereby the last portion of the opening movement of the throttle valve opens the choke valve under all conditions.

12. In a fuel system for a combustion engine, means governed by temperature for limiting the maximum of the throttled volume of the working fluid, so that said maximum is lower at low temperatures than at normal temperatures.

13. In a carburetor for an internal combustion engine having a main carbureting passage with choke and throttle valves mounted therein, an automatic choke device comprising a thermostatic control for said choke valve, connecting means between said choke valve and said throttle valve to restrict the closing movement of said throttle valve when said choke valve is closed, suction responsive means operative when the engine starts to move said connecting means towards inoperative position, and means becoming operative when said throttle valve is in substantially wide open position to partially open the choke valve.

14. In a carburetor, a throttle, a source of suction beyond the throttle, a choke valve, temperature responsive means influencing the position of the choke valve, pressure responsive means communicating with the source of suction, and positive means including a cam remote from but governed by both the position of the choke valve and the pressure responsive means for influencing the movement of the throttle.

15. In a carburetor, a choke valve, a throttle valve, temperature responsive means separate from the carburetor and connected to the choke valve for influencing the position of the choke valve, and unyielding means interconnecting the temperature responsive means and the throttle valve controlled by the position of the choke valve for preventing the throttle valve from completely closing, said means being rendered inoperative when the choke valve assumes substantially wide open position.

16. In combination with an internal combustion engine, a carburetor having a choke valve and a fuel nozzle, means responsive to the operating temperature of the engine for varying the quantity of fuel supplied to said nozzle and means operated by said temperature responsive means for limiting the movement of said choke valve in closing direction.

17. In combination with an internal combustion engine, a carburetor having a choke valve and a fuel supply passage, means, responsive to the operating temperature of the engine, for varying the quantity of fuel supplied to said fuel passage and means operated by said temperature responsive means for limiting the movement of said choke valve in closing direction.

18. In combination with an internal combustion engine, a carburetor having a choke valve and a fuel nozzle, means responsive to the operating temperature of the engine for varying the quantity of fuel supplied to said nozzle, means for moving said choke valve in closing direction when the engine is stopped, and means responsive to an engine function for opening said choke valve when the engine is running, and means operated by said temperature responsive means for limiting the movement of said choke valve in closing direction.

19. In a carburetor for an internal combustion engine having a main carbureting passage with choke and throttle valves mounted therein, an automatic choke device comprising a thermostatic control for said choke valve, connecting means between said choke valve and said throttle valve to restrict the closing movement of said throttle valve when said choke valve is closed, suction responsive means operative when the engine starts, to move said connecting means towards inoperative position, and means becoming operative when said throttle valve is moved to substantially wide open position to positively open the choke valve.

20. In a carburetor for an internal combustion engine having a main carbureting passage with choke and throttle valves mounted therein, an automatic choke device comprising a thermostatic control for said choke valve, connecting means between said choke valve and said throttle valve to restrict the closing movement of said throttle valve when said choke valve is closed, suction responsive means operative when the engine starts, to move said connecting means towards inoperative position, and means becoming operative when said throttle valve is moved to substantially wide open position to positively partially open the choke valve.

21. In a carburetor, a choke valve opening in response to suction, means for limiting closing movement of said valve upon decrease in suction but permitting additional opening movement of the valve upon increase in suction, a throttle valve, means actuated by opening movement of said throttle for actuating said limiting means, and a cam member operably connected to said choke and operatively associated with said throttle to vary the extent of the throttle closing movement in accordance with the position of the choke as determined by suction.

22. In a carburetor for an internal combustion engine, a choke, a throttle, a thermostat for resiliently resisting opening of said choke at low temperatures, a suction responsive device arranged for operating upon said choke for opening said choke against said thermostat upon starting of the associated engine with the throttle only partially open, and an interconnection between said choke and throttle for causing partial opening of said choke against said thermostat upon substantial additional opening of said throttle.

23. In a carburetor for internal combustion engines, a throttle, a choke valve, means including a heat responsive device to close said choke valve at low temperature, a device responsive to suction posterior to the throttle for causing at least a partial opening of said choke valve against the tension of said thermostat upon starting of the engine, and means interconnecting said choke valve and throttle for limiting the closing of said throttle to a fast idle position when said choke valve is under the influence of both said thermostat and suction.

24. In a carburetor for an internal combustion engine, a throttle, a choke, means including a thermostat for yieldingly resisting opening of said choke at low temperatures, a device for opening said choke against said thermostat upon starting of the associated engine, a stop element movable with said throttle, and a cam pivotally mounted adjacent said stop element and connected to said choke for variably limiting the extent of closing of said throttle in accordance with the position of said choke.

25. In a carburetor for an internal combustion engine having a main carbureting passage with choke and throttle valves mounted therein, an automatic choke device comprising a control for said choke valve, a thermostat for actuating said control, said thermostat being free to move further than is required for its action on said control, connecting means between said choke valve and said throttle valve to restrict the closing movement of said throttle valve when said choke valve is closed, suction responsive means operative when the engine starts, to move said connecting means toward inoperative position, and means becoming operative when said throttle valve is moved to substantially wide open position to positively partially open said choke valve.

26. In a carburetor, choke and throttle valves, a thermostat and a suction motor controlling said choke valve, a member movable with said throttle, and a pivoted stop element movable with said choke and normally engageable by said member to variably limit the throttle closing movement to normal and fast idle positions.

27. In a carburetor, choke and throttle valves, a thermostat for yieldingly closing said choke valve when the temperature is low, an adjustable element movable with said throttle, and a cam pivoted on the carburetor body adjacent said element and moved by said choke, said element being normally engageable with the periphery of said cam to variably limit the closing movement of said throttle to determine its idle position.

28. In a carburetor for an internal combustion engine, a choke, a throttle, a thermostat for resiliently holding said choke closed for cold starting, a suction responsive device for opening said choke against said thermostat upon starting of the associated engine, an interconnection between said choke and throttle for causing partial opening of said choke against said thermostat upon substantial opening of said throttle, and means for partially opening said choke by said suction device upon closing of said throttle.

29. In a carburetor for an internal combustion engine, a choke, a thermostat for resiliently holding said choke closed for cold starting, a suction responsive device for opening said choke against said thermostat upon starting of the associated engine, a throttle valve, interconnection between said choke and throttle for causing partial opening of said choke upon substantial opening of said throttle, a pivoted stop element movable with said choke and normally associated with said throttle to variably limit the throttle closing movement to determine its idle position, and means for opening said choke by said suction responsive device upon closing of said throttle.

30. In a carburetor for an internal combustion engine, a choke automatically positioned by temperature and vacuum in accordance with engine conditions, a member movable with said choke as it is automatically positioned, and a member carried by said throttle and operably associated with said movable member to position said throttle so that it will assume a fast idle position when the temperature is low and a normal idle position as the engine temperature increases.

31. A control mechanism for an internal combustion engine carburetor having choke and throttle valves, a thermostat tensioned for variably opposing the opening of the choke valve as a function of temperature, said thermostat being so constructed and arranged as to initially oppose the choke movement with maximum tension and being rendered ineffective to oppose further choke movement after normal operating temperature is attained, a connection between said choke and throttle for partially opening said choke upon full opening of said throttle, means for maintaining said throttle in idling position, said means being operated by said thermostat, and a suction motor opposing said thermostat when the engine is running to move said choke toward open position, said suction motor being operated by suction posterior to said throttle, and co-acting with said thermostat in determining the idling position of said throttle.

32. In an internal combustion engine having an intake manifold, a carburetor, a choke valve, a throttle valve, means for holding said throttle in partial open position at low vacuum, and means for varying the low vacuum position of said throttle in accordance with temperature.

33. In a carburetor for attachment to an intake manifold of an internal combustion engine, a choke valve, a throttle valve, means for holding said throttle valve in partial open position at low vacuum, means for varying and maintaining said throttle position in accordance with temperature, a suction controlled element connected to said choke valve for moving same toward open position at high suction, and resilient means opposing movement of said suction controlled element to move said choke valve toward closed position at low suction.

34. In a carburetor for attachment to an intake manifold of an internal combustion engine, a choke valve, means controlled by temperature and vacuum for varying the position of said choke, a throttle valve, means for partially opening said throttle toward fast idle position at low vacuum, means for moving said throttle toward idling position at normal firing vacuum, and means for varying said idling position in accordance with temperature.

WARREN F. STANTON.